United States Patent Office 2,815,255
Patented Dec. 3, 1957

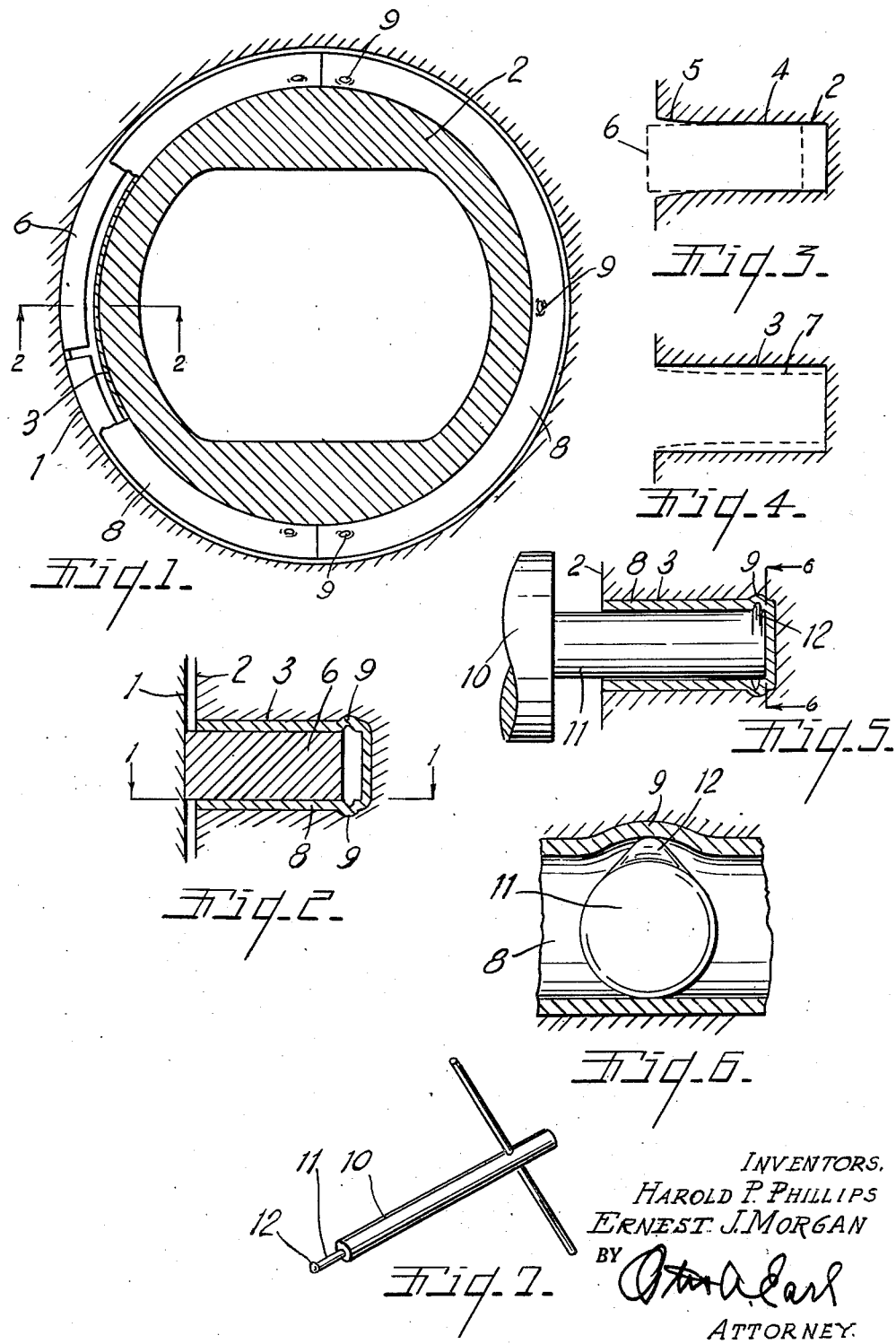

2,815,255
PISTON HAVING A LINED RING GROOVE AND LINER THEREFOR

Harold P. Phillips and Ernest J. Morgan, Hastings, Mich., assignors to Hastings Manufacturing Company, Hastings, Mich., a corporation of Michigan Application August 22, 1955, Serial No. 529,652

6 Claims. (Cl. 309—14)

This invention relates to improvements in a piston having a lined ring groove and liner therefor.

The main objects of this invention are:

First, to provide a piston having a groove of an axial width exceeding the width of the ring to be installed therein with a liner which can be readily installed without distortion thereof and which when installed becomes in effect an integral part of the piston.

Second, to provide a liner adapted to be installed as above indicated which may be installed very rapidly and easily by unskilled workmen.

Third, to provide a structure of this type which may be very economically produced and is readily adapted for use as a liner in regrooved pistons or as a liner for original installations to provide relatively hard, wear resistant walls in pistons formed of relatively softer material.

Objects relating to details and economies of the invention will appear from the description to follow. The invention is defined and pointed out in the claims.

A preferred embodiment of the invention is illustrated in the accompanying drawing, in which:

Fig. 1 is a fragmentary view of a cylinder and piston assembly embodying our invention taken on a line corresponding to line 1—1 of Fig. 2, the cylinder being conventionally indicated.

Fig. 2 is a transverse section on a line corresponding to line 2—2 of Fig. 1.

Fig. 3 is a fragmentary view conventionally illustrating a piston ring groove that has become worn in use and a piston ring therein indicated by dotted lines.

Fig. 4 is a similar view with the ring omitted illustrating a groove that has been machined or regrooved, as it is commonly called, the cut-away portions being indicated by dotted lines.

Fig. 5 is a fragmentary view illustrating a liner member installed in the enlarged groove and a tool for locking the element within the groove.

Fig. 6 is an enlarged fragmentary view in section on a line 6—6 of Fig. 5.

Fig. 7 is a perspective view of the tool for anchoring or securing the liner sections within the groove.

It will be understood that in the accompanying drawing no attempt has been made to show the parts with commercial clearances and tolerances or to maintain the relative proportions thereof as commercially used. The applicants are aware that liners of various types have been provided for the grooves of regrooved pistons and some of them have been used commercially but great difficulty has been experienced in installing them without distortion, particularly where they are of outwardly facing channel section, for example as is illustrated in the application of the applicant Harold P. Phillips, filed June 29, 1953, Serial Number 364,534. Both applicants are very familiar with that structure, being associated with the Hastings Manufacturing Company, of Hastings, Michigan, assignee of that and also of this application.

In the accompanying drawing, 1 represents a cylinder, and 2 a piston having a piston ring groove 3 therein. This piston ring groove 3 illustrated is a machined groove, the original groove indicated at 4 in Fig. 3 having been of less width than the groove 3. The original groove at 4 as illustrated in Fig. 3 has become worn by use as is indicated at 5 so that the efficiency of the ring 6, indicated by dotted lines in Fig. 3, is materially reduced.

In Fig. 4 the portion of the wall of the groove indicated by dotted lines at 7 has been cut away to bring the walls of the groove 3 into parallel relation and this substantially widens the groove, either requiring the use of a liner or of a wider piston ring. Presently most engineering specifications call for narrow or axially thin piston rings.

The liner of our invention comprises complementary segmental sections 8, 8 formed of ductile metal conformed to outwardly facing channel section. These liner segments or sections in the embodiment illustrated are arcs of 180 degrees and are disposed with their ends in abutting relation as is shown in Fig. 1. The width of the liner segments is such that the flanges are in supported relation to the walls of the groove and the sections are seated on the bottom of the groove as is shown in Figs. 2 and 5.

The sections are securely fixed within the groove by indenting lug-like portions 9 thereof into the walls of the groove. There are preferably opposed pairs of these lugs, as shown in Figs. 2 and 5, and they are located closely adjacent to the bottom of the liner segments and normally inwardly of the ring 6 installed therein so that any possible distortion of the walls of the liner incident to the indenting of the lugs into the walls of the groove does not affect the action of the ring installed therein which is illustrated as being of the split expansible type. It will be understood, however, that the liner is adapted to any type of ring. We desire to again point out that while our improved liner is especially designed for regrooved pistons, it is also desirable for use in new pistons to provide grooves with wear resisting walls.

In installing, the sections are independently inserted in the groove and fixedly secured therein, desirably by use of a tool 10 provided with a bit 11 of a diameter approximating the distance between the walls of the liner and having a projecting nose 12. The bit is inserted in the liner with its inner end in abutting relation to the bottom of the liner as shown in Fig. 5 and the tool rotated to form and force the lug-like indentations 9 into the walls of the groove.

In Fig. 6 we illustrate the position of the tool as one indentation 9 is formed. The tool is then rotated to form the opposed indentation resulting in indentations as shown in Fig. 2. In the preferred installation a pair of these indentations are located adjacent the ends of each section. Other indentations may be formed as desired, 90 degrees indentation being indicated in Fig. 1.

The liner may be very quickly installed and is securely anchored so that it in effect becomes an integral part of the piston. It may be installed without distorting or twisting in any way and the walls or flanges of the liner sections are in supported relation to the walls of the groove. The liner is desirably of such radial thickness that the peripheral edges thereof are flush with the periphery of the piston.

The liner segments may be very economically produced, desirably from ductile ribbon stock and a liner may be installed quickly and properly by relatively inexperienced workmen.

We have illustrated and described our invention in a highly practical commercial embodiment thereof. We have not attempted to illustrate or describe other embodiments or adaptations which we contemplate for particular pistons as it is believed that this disclosure will enable those skilled in the art to embody or adapt our invention as may be desired.

Having thus described our invention, what we claim as new and desire to secure by Letters Patent is:

1. A piston having a piston ring groove of an axial width exceeding the width of the ring element to be installed therein, and a liner for said groove comprising complementary segmental sections of outwardly facing channel section formed of ductile metal disposed within said groove in supported relation to the bottom thereof and with their flanges in supported relation to the walls of the groove, the flanges of each of the sections adjacent the ends thereof having opposed retaining lugs struck axially therefrom and disposed closely adjacent the webs of the sections and embeddedly engaging the walls of the groove, said lugs being closely adjacent the bottoms of the liner sections, the flanges of the installed liner being substantially parallel, their peripheral edges being substantially flush with the surface of the piston.

2. A piston having a piston ring groove of an axial width exceeding the width of the ring element to be installed therein, and a liner for said groove comprising complementary segmental sections of outwardly facing channel section formed of ductile metal disposed within said groove in supported relation to the bottom thereof and with their flanges in supported relation to the walls of the groove, the flanges of each of the sections adjacent the ends thereof having opposed retaining lugs struck axially therefrom and disposed closely adjacent the webs of the sections and embeddedly engaging the walls of the groove, said lugs being closely adjacent the bottoms of the liner sections.

3. A piston having a piston ring groove of an axial width exceeding the width of the ring element to be installed therein, and a liner for said groove comprising complementary segmental sections of outwardly facing channel section formed of ductile metal disposed within said groove in supported relation to the bottom thereof and with their flanges in supported relation to the walls of the groove, the flanges of each of the sections having retained lugs struck axially therefrom and disposed closely adjacent the webs of the sections and embeddedly engaging the walls of the groove.

4. A liner for a piston ring groove of a width exceeding the width of the ring element to be installed therein, said liner comprising complementary segmental sections of outwardly facing channel section formed of ductile metal, the sections being disposed within the groove in end abutting relation to each other and in supported relation to the bottom of the groove and with their flanges in supported relation to the walls of the groove, the flanges of each of the sections having opposed lug-like portions, adjacent the ends thereof projecting axially therefrom and embeddedly engaging the walls of the groove and anchoring said sections against axial and rotative movement relative to said groove, said lug-like portions being closely adjacent the bottoms of the sections, the flanges of the installed liner being substantially parallel and their peripheral edges being substantially flush with the surface of the piston.

5. A liner for a piston ring groove of a width exceeding the width of the ring element to be installed therein, said liner comprising complementary segmental sections of outwardly facing channel section formed of ductile metal, the sections being disposed within the groove in end abutting relation to each other and in supported relation to the bottom of the groove and with their flanges in supported relation to the walls of the groove, the flanges of each of the sections having opposed lug-like portions adjacent the ends thereof projecting axially therefrom and embeddingly engaging the walls of the groove and anchoring said sections against axial and rotative movement relative to said groove, said lug-like portions being closely adjacent the bottoms of the sections.

6. A liner for a piston ring groove of a width exceeding the width of the ring element to be installed therein, said liner comprising complementary segmental sections of outwardly facing channel section formed of ductile metal, the sections being disposed within the groove in end abutting relation to each other and in supported relation to the bottom of the groove and with their flanges in supported relation to the walls of the groove, the flanges of each of the sections having lug-like portions thereof embeddingly upset into the walls of the groove and anchoring said sections against axial and rotative movement relative to said groove.

References Cited in the file of this patent

UNITED STATES PATENTS

| 1,781,207 | Wysong | Nov. 11, 1930 |
| 2,716,581 | Townhill | Aug. 30, 1955 |

FOREIGN PATENTS

| 425,683 | Great Britain | Mar. 18, 1935 |
| 913,136 | France | May 20, 1946 |
| 1,066,931 | France | Jan. 27, 1954 |